United States Patent [19]

Marsac et al.

[11] Patent Number: 5,929,137
[45] Date of Patent: Jul. 27, 1999

[54] PROCESS FOR THE PRODUCTION OF IMPROVED DIELECTRIC STRENGTH MATERIALS AND THE USE OF MATERIALS OBTAINED BY THIS PROCESS IN THE MANUFACTURE OF POWER TRANSMISSION CABLES

[75] Inventors: Didier Marsac, Ecully; Patrick Hourquebie, Indre, both of France

[73] Assignee: Commissariat A L'Energie Atomique, Paris, France

[21] Appl. No.: 08/913,366

[22] PCT Filed: Mar. 27, 1996

[86] PCT No.: PCT/FR96/00455

§ 371 Date: Sep. 29, 1997

§ 102(e) Date: Sep. 29, 1997

[87] PCT Pub. No.: WO96/30914

PCT Pub. Date: Oct. 3, 1996

[30] Foreign Application Priority Data

Mar. 28, 1995 [FR] France ................................ 95 03617

[51] Int. Cl.⁶ ........................................................ C08K 9/00
[52] U.S. Cl. ........................... 523/205; 525/185; 525/540
[58] Field of Search ............................. 523/205; 525/185, 525/540

[56] References Cited

U.S. PATENT DOCUMENTS

| | | | |
|---|---|---|---|
| 4,680,236 | 7/1987 | Myers | 428/515 |
| 4,692,225 | 9/1987 | Witucki | 204/59 |
| 4,731,390 | 3/1988 | Mizuno | 525/189 |
| 4,740,532 | 4/1988 | May | 525/455 |
| 5,254,633 | 10/1993 | Han | 525/327.4 |
| 5,498,372 | 3/1996 | Hedges | 252/511 |
| 5,700,398 | 12/1997 | Angelopoulos | 252/500 |

FOREIGN PATENT DOCUMENTS

| | | |
|---|---|---|
| 0 385 523 | 9/1990 | European Pat. Off. . |
| 0 507 676 A2 | 1/1992 | European Pat. Off. . |
| 0 473 224 | 4/1992 | European Pat. Off. . |
| WO 89/01015 | 9/1989 | WIPO . |

*Primary Examiner*—Paul R. Michl
*Attorney, Agent, or Firm*—Oblon, Spivak, McClelland, Maier & Neustadt, P.C.

[57] ABSTRACT

The invention relates to a process for the production of a material having an improved dielectric strength and use of said material in the manufacture of power transmission cables.

The object of the invention is to obtain mixtures remaining macroscopically very insulating and which locally, at a scale below 1 micron, can have conductivity levels of approximately $10^{-9} S.cm^{-1}$.

This object is achieved with the aid of a process comprising the following stages:
dissolving at least one conductive polymer in an organic solvent, to form an impregnation solution and impregnating granules constituted by an insulating polymer or a mixture of insulating polymers,
evaporating the solvent to obtain insulating polymer granules covered with a conductive polymer,
drying said granules,
hot mixing or extruding said granules to form a homogeneous mixture, which can be restored to granule form.

18 Claims, 1 Drawing Sheet

PROCESS FOR THE PRODUCTION OF IMPROVED DIELECTRIC STRENGTH MATERIALS AND THE USE OF MATERIALS OBTAINED BY THIS PROCESS IN THE MANUFACTURE OF POWER TRANSMISSION CABLES

BACKGROUND OF THE INVENTION

1. Field of the Invention

The invention relates to a process for the production of a material having an improved dielectric strength, the material itself and the use of the material obtained by the aforementioned process in the manufacture of power transmission cables or any other device requiring an electrical insulation.

More specifically, the invention relates to a process making it possible to obtain such a material formed from a conductive polymer (single conductive polymer grafted onto an insulating polymer or copolymer containing one or more combined systems), dispersed in an insulating polymer or in an insulating polymer mixture.

2. Description of the Background

Generally, defects present in the natural state in insulating polymers and materials, such as e.g. impurities or cavities resulting from synthesis or shaping of the material, lead to local charge build-ups when said material is exposed to an electric field. Such charge build-ups can lead to material breakdown phenomena. Therefore materials having improved breakdown resistance characteristics have been developed and can be used in any device requiring an electrical insulation and in particular in very high voltage cables. Such a cable generally comprises a conductive core covered with a semiconductor screen and then an insulating material sheath, finally followed by an external protective sheath. In such cables it is necessary to have low dielectric losses and constants in order to bring about the transmission of power over long distances.

EP 507 676 discloses a material for a semiconductor screen usable in the manufacture of high voltage cables and in the electromagnetic shielding of electrical and electronic equipment. This material has a conductivity below $10^{-8}$ S/m, but which is liable to rise under the effect of an electric field. This material incorporates an insulating polymer matrix into which is incorporated at least 5 to 70 wt. % of a second undoped or dedoped, conjugate polymer, which is not intrinsically conductive and having a conductivity below $10^{-4}$ S.m$^{-1}$, but liable to increase under the effect of an electric field.

However, the production of such materials by the direct mixing of powders of different constituents does not make it possible to obtain the desired improvement to the dielectric properties of the material.

WO 89/01015 discloses a composite composition of an insulating polymer and a conductive polymer based on poly(alkylthiophene) doped by an electron donor or acceptor. The production of this material is brought about by mixing insulating polymer and conductive polymer powders. The mixture obtained is shaped by conventional polymer production methods. The aim is to obtain mixtures having conductivity levels generally between $10^{-10}$ and 100 S.cm$^{-1}$.

EP 385 523 discloses a process for the preparation of electrically conductive polymers derived from 3-alkylthiophenes consisting of carrying out the chemical polymerization of the 3-alkylthiophene by means of a ferric salt, an alkyl halide and water. The thus obtained poly (alkylthiophenes) can be mixed with insulating polymers of the polyethylene type and hot compressed in order to obtain composite objects or plates. The aim is to obtain mixtures with a conductivity of approximately $10^{-6}$ to 1 S.cm$^{-1}$.

However, in general terms, the mixing of conductive polymer powders at levels of approximately 10 to 1000 ppm in insulating polymers normally leads to materials which appear heterogeneous at a scale of approximately 1 micron when observed in scanning electron microscopy (cf. attached FIG. 1). At such low charge levels, a poor dispersion at a scale of 1 micron does not make it possible to obtain the sought improvement to the dielectric properties.

SUMMARY OF THE INVENTION

The object of the invention is to solve the problems referred to hereinbefore and to develop a process for the production of materials having an improved dielectric strength making it possible to obtain mixtures remaining macroscopically very insulating (conductivity approximately $10^{-16}$ S.cm$^{-1}$) and which locally, at a quasimolecular scale, can have conductivities of approximately $10^{-9}$ S.cm$^{-1}$.

According to the features of the invention, said process comprises the following stages:

dissolving at least one conductive polymer in an organic solvent, so as to form an impregnation solution, impregnating granules constituted by an insulating polymer or insulating polymer mixture with said impregnation solution, evaporating the solvent so as to obtain insulating polymer granules covered with a conductive polymer, drying said granules, hot mixing or extruding said granules to form a homogeneous mixture.

DETAILED DESCRIPTION OF THE INVENTION

Figure 1:
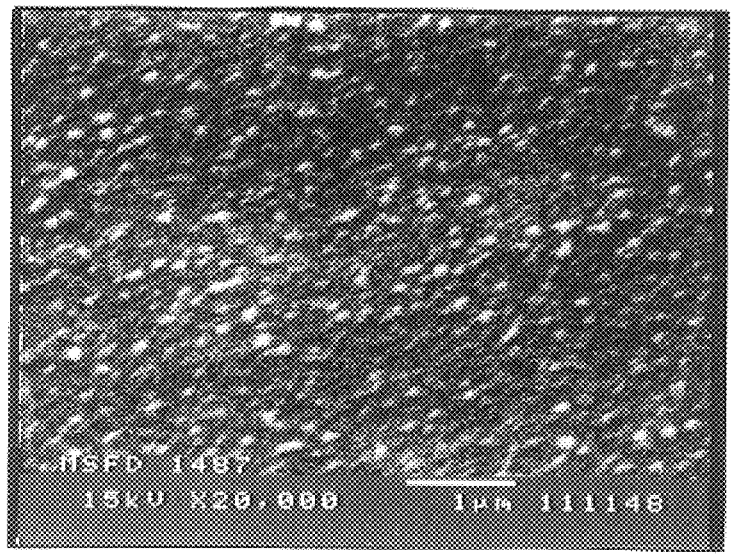

Preferably, said mixture is prepared in the form of a strip or ring or any other shape obtainable by moulding, calendering, injection and in particular in the form of granules which can serve as a basis for more dilute mixtures.

As a result of this production process, a material is obtained having a very low charge level and homogeneous at a scale of 0.1 micron, as can be observed in electron scanning microscopy, which avoids a charge build-up, without modifying the value of the dielectric constant and the dielectric losses of the insulating polymer used. Thus, the dielectric properties of the overall material are improved.

In addition, said process can be very rapidly adapted to the industrial manufacturing process for high voltage cables, on the basis of chemically crosslinkable polyethylene (hereinafter called CCP). It is then merely necessary to replace the conventional CCP granules by CCP granules prepared by the process according to the invention. These granules can then be used in all conventional polymer shaping methods, namely moulding, calendering, injection or extrusion.

Preferably, the conductive polymer represents 10 to 1000 ppm of the insulating polymer.

Advantageously, the granules constituted by an insulating polymer or insulating polymer mixture are impregnated with said impregnation solution by soaking therein. However, they could also be obtained by the vaporization thereof.

The granules are preferably dried in vacuo and in an oven, at a temperature dependent on the solvent used. In the case of tetrahydrofuran (THF), working can take place at ambient temperature.

Preferably, the insulating polymer used in the process according to the invention is chosen from among thermoplastic resins of the acrylic, styrene, vinyl or cellulose resin types, polyolefins, fluoropolymers, polyethers, polyimides, polycarbonates, polyurethanes, silicones, their copolymers or mixtures between homopolymers and copolymers.

In particular, said thermoplastic polymer is chosen from among polyethylene (PE), low density polyethylene (LDPE), high density polyethylene (HDPE) and linear low density polyethylene (LLDPE), polypropylene (PP), ethylene-propylene diene monomer (EPDM), polyvinylidene fluoride (PVDF), ethylene butacrylate (EBA) or ethylene and vinyl acetate copolymers (EVA), taken singly or in mixture.

The insulating polymer can also be a thermosetting polymer chosen from among polyesters, epoxy resins or phenolic resins.

Advantageously, the conductive polymer has a melting or softening point compatible with its use with the insulating polymer adopted. Moreover, the purity of said conductive polymer must be at a maximum, otherwise the impurities can influence the voltage resistance characteristics obtained with the materials according to the invention. It must be soluble in organic solvents in its doped state (oxidized) or preferably in its dedoped state (reduced).

The conductive polymer is an organic charge having a $\pi$ electron system, delocalized on at least 7 atoms, on the main chain of the polymer or the branches thereof. This conductive polymer can either be a single conductive polymer, or a conductive polymer grafted on an insulating polymer, or a copolymer containing one or more conjugate systems, or any sufficiently delocalized organic molecule or having an adequate conductivity of at least approximately $10^{-9}$ S.cm$^{-1}$.

Such molecules can e.g. be polypeptides or vitamin A. In the case of polymers, the latter is advantageously chosen from within the group including polythiophene, polyalkylthiophenes, polyaniline, polypyrrole, polyacetylene, polyparaphenylene, their derivatives or their mixtures.

The invention also relates to an improved dielectric strength material, characterized in that it comprises 10 to 1000 ppm of a conductive polymer dispersed in an insulating polymer and able to have heterogeneities with a size equal to or below 0.1 $\mu$m, as can be observed in scanning electron microscopy.

The conductive and insulating polymer materials used are those referred to hereinbefore.

This material and that obtained by the process according to the invention have dielectric characteristics (dielectric constant, dielectric losses) similar to those of an insulating polymer, but which do not build up the charges with respect to defects, such as impurities or cavities. This material has the property of not being charged under the influence of a 30 kV electron beam in a scanning electron microscope chamber. The charge quantity adopted on the basis of the aforementioned experiment can be fixed by the conductive polymer level introduced into the mixture, by the structural characteristics thereof and by the temperature at which the experiment is performed.

Finally, the invention also relates to the use of the dielectric strength material obtained by the process according to the invention in the manufacture of power transmission cables or for devices using an electrical insulator which may be damaged as a result of a charge build-up in the insulator.

More specifically, it is possible to replace chemically crosslinkable polyethylene (CCP) used at present in very high voltage cables by the material obtained by the process of the invention.

The invention is described in greater detail hereinafter relative to non-limitative examples and the attached drawings, wherein show:

FIG. 1 A scanning electron microscope view of a dielectric strength material produced according to the prior art by simply mixing conductive and insulating polymer powders.

Figure 2:

FIG. 2 A scanning electron microscope view of a dielectric strength material according to the invention formed on the basis of low density polyethylene and poly(3-octyl thiophene).

Figure 3:
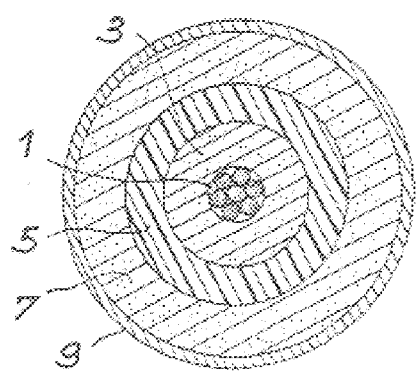

FIG. 3 A sectional view of an example of a power transmission cable, whose insulator is constituted by the material according to the invention.

Hereinafter will be given examples of materials produced using the process according to the invention.

EXAMPLE 1

Product Formed on the Basis of a Conductive Polymer and an Insulating Polymer

Poly(3-octyl thiophene) (hereinafter called POT) was synthesized by ferric chloride oxidation in chloroform in accordance with the method described in the article by R. Sugimoto, S. Takeda, H. B. Gu, K. Yoshino, Chemistry Express, vol. 1, No. 11, pp 635–638, 1986 and illustrated hereinafter:

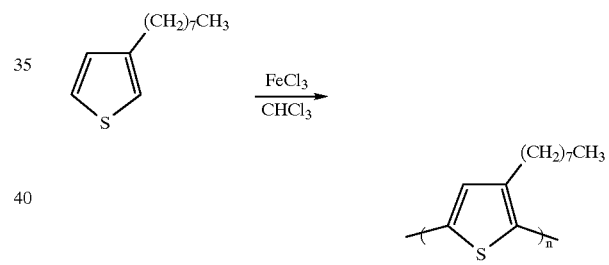

The composition and distribution of the molecular weights of the conductive polymer obtained are given hereinafter:

| ELEMENTARY ANALYSIS | | | | | |
|---|---|---|---|---|---|
| | C% | H% | S% | Fe% | Cl% |
| POT (theoretical) | 74.2 | 9.3 | 16.5 | 0 | 0 |
| POT (FeCl$_3$) | 73 | 9.1 | 15.6 | 0.8 | <0.3 |

| EVALUATION OF THE AVERAGE MOLECULAR WEIGHTS | | | | |
|---|---|---|---|---|
| | Mw | Mn | Mw/Mn | DPn |
| POT (FeCl$_3$) | 238000 | 39800 | 6 | 204 |

Mw represents the weight-average molecular weight, Mn the number-average molecular weight and DPn the number-average degree of polymerization. These results are obtained by steric exclusion chromatography following calibration with the aid of standard polystyrene samples.

This was followed by the dissolving of 100 mg of the aforementioned polymer in 200 cm$^3$ of tetrahydrofuran (THF), so as to obtain the impregnation solution. To said impregnation solution were then added 200 g of low density polyethylene (LDPE) granules, i.e. the insulating polymer.

The solvent was evaporated at 50° C. with the aid of a rotary evaporator. Following said evaporation, a conductive polymer film was deposited on the outer surface of the insulating polymer granules. These granules were then dried in vacuo, at ambient temperature for 24 hours and then extruded with the aid of a flat die, so as to obtain a 50 mm wide mixture strip. The material is then in the form of a brick red translucent strip.

Analysis by scanning electron microscopy detects no heterogeneity of the mixture at a scale of 0.1 micron (cf. FIG. 2). For comparison purposes, the same material produced by directly mixing the conductive polymer powder and insulating polymer powder prior to extrusion leads to a material having heterogeneities of approximately 0.2 micron (cf. FIG. 1).

The dielectric characteristics of the thus obtained material were measured with the aid of a RCHP 4284 A bridge and a HP 16451 B measuring cell and were compared with those of fresh polyethylene. For a frequency of 1000 Hz, for the low density polyethylene matrix are obtained $\epsilon r=2.2$ and $tg\delta=3$ to $5.10^{-4}$. For the LDPE/POT mixture according to the invention (500 ppm of POT in LDPE), $\epsilon r=2.2$ and $tg\delta=2$ to $8.10^{-4}$ are obtained.

These results demonstrate that 500 ppm of conductive polymer do not modify the dielectric properties of the basic insulating polymer.

EXAMPLE 2

Product Formed on the Basis of a Conductive Polymer and an Insulating Polymer

Poly(3-butyl thiophene) (hereinafter called PBT) was synthesized in accordance with the general method described in the document by O. Inganäs, W. R. Salaneck, J. E. Osterholm, J. Laakso, Synthetic Metals, 22, pp 395–406, 1988, but replacing iodine by bromine and illustrated hereinafter:

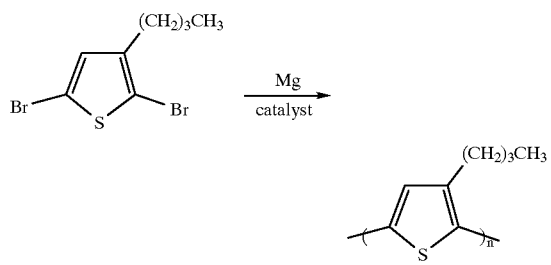

The composition and distribution of the molecular weights of the polymer obtained are given in the following tables.

| ELEMENTARY ANALYSIS | | | |
|---|---|---|---|
| | C% | H% | S% |
| PBT (theoretical) | 69.6 | 7.2 | 23.2 |
| PBT (MgX) | 69.5 | 7.3 | 23.1 |

| EVALUATION OF THE AVERAGE MOLECULAR WEIGHTS | | | |
|---|---|---|---|
| | Mw | Mn | Mw/Mn | DPn |
| PBT (MgX) | 56300 | 12000 | 4.7 | 87 |

Mw represents the weight-average molecular weight, Mn the number-average molecular weight and DPn the number-average degree of polymerization. The results are obtained by steric exclusion chromatography following calibration with the aid of standard polystyrene samples.

The polymer obtained is used as in the preceding example 1 giving an orange translucent strip. The dielectric characteristics of this material measured as in example 1 are $\epsilon r=2.2$ and $tg\delta=4.10^{-4}$.

EXAMPLE 3

Product Formed on the Basis of a Conductive Polymer and an Insulating Polymer

The method of example 1 is used for obtaining chemically crosslinkable polyethylene (CCP) granules, impregnated with poly(3-butyl thiophene). The granule impregnation stage only lasts a few minutes corresponding to the time necessary for evaporating the solvent. This short stage does not extract the peroxide contained in the CCP. The mixture obtained is then crosslinked to give the final material. The dielectric characteristics of this material, measured as in example 1, are $\epsilon r=2.3$ and $tg\delta=8.10^{-4}$.

EXAMPLE 4

Product Formed on the Basis of a Conductive Polymer and an Insulating Polymer

This example uses as the conductive polymer a polyaniline powder doped with dodecyl benzene sulphonic acid produced according to the process described in the article by Y. Cao, P. Smith, A. J. Heeger, Synthetic Metals, 48, pp 91–97, 1992. The polyaniline powder is dissolved in xylene. This solution is then used for impregnating low density polyethylene (LDPE) granules according to the operating procedure of example 1. The granules obtained are then extruded as in example 1 giving a green translucent strip. The dielectric characteristics of this material, measured as in example 1, are $\epsilon r=2.2$ and $tg\delta=5.10^{-4}$.

EXAMPLE 5

Product Formed on the Basis of a Conductive Polymer and an Insulating Polymer

In this case a mixture was formed on the basis of poly(phenylene vinylene) (conductive polymer) and low density polyethylene (insulating polymer). The conductive polymer precursor is deposited on polyethylene grains and chemically polymerized. The granules are then extruded as in example 1 giving a yellow translucent strip. Measured as in example 1, the dielectric characteristics of this material are $\epsilon r=2.2$ and $tg\delta=4.10^{-4}$.

EXAMPLE 6

Product Formed on the Basis of a Conductive Polymer and an Insulating Polymer Mixture The method of example 1 is used for treating a mixture of granules formed by 30 wt. % high density polyethylene and 70 wt. % low density polyethyene with a solution of poly(3-octyl thiophene). The thus modified granules are extruded in strip form. Measured as in example 1, this material has the following characteristics:

$\epsilon r=2.2$ and $tg\delta=4.10^{-4}$.

EXAMPLE 7

Product Formed on the Basis of an Insulating Polymer and a Conductive Polymer Grafted on an Insulating Polymer A grafted conductive polymer is obtained by a method described by B. FRANCOIS, T. OLINGA, J. Chim. Phys. 1992, 89, pp 1079–1084. The first stage of this synthesis consists of preparing by the radical method a statistical styrene/2 or 3 vinyl thiophene copolymer. This is followed by the polymerization of the thiophene in the presence of said copolymer. The resulting grafted conductive polymer is solubilized in THF. The polyethylene granules are treated according to the process of the invention with the aid of said solution. The granules obtained are then extruded. The characteristics of this material, measured as in example 1, are $\epsilon r=2.2$ and $tg\delta=5.10^{-4}$.

EXAMPLE 8

Product Formed on the Basis of an Insulating Polymer and a Copolymer Containing a Conjugate System A polystyrene/polythiophene copolymer is obtained according to a method described by B. FRANCOIS, T. OLINGA, J. Chim. Phys. 1992, 89, pp 1079–1084. The principle consists of fixing a 2-bromothiophene or thiophene unit to the end of a "living" polystyrene obtained by anionic polymerization, then oxidatively polymerizing the thiophene in the presence of said functionalized polystyrene, in a chloroform medium and at 5° C. for 1 hour. The copolymer obtained is solubilized in THF. The polyethylene granules are treated according to the process of the invention with the aid of said solution. The granules obtained are then extruded. The characteristics of this material, measured as in example 1, are $\epsilon r=2.2$ and $tg\delta=3.10^{-4}$.

EXAMPLE 9

Manufacturing a Power Cable

As shown in FIG. 3, said cable comprises a conductive core 1 successively covered with an internal semiconductor screen 3, the insulator 5 according to the invention, an external semiconductor screen 7 and a protective sheath 9. The thus obtained cable has no charge build-up in the insulator and consequently has better breakdown resistance properties.

We claim:
1. Process for the production of improved dielectric strength materials, comprising:
dissolving at least one conductive polymer in an organic solvent, so as to form an impregnation solution,
impregnating granules constituted by an insulating polymer or an insulating polymer mixture with said impregnation solution,
evaporating the solvent so as to obtain insulating polymer granules covered with a conductive polymer,
drying said granules, and
hot mixing or extruding said granules to form a homogenous mixture,
wherein said improved dielectric strength material is a dielectric.

2. Production process according to claim 1, wherein the conductive polymer comprises 10 to 1000 ppm of the insulating polymer.

3. Production process according to claim 1, wherein the impregnation of the granules takes place by soaking the latter in an impregnation solution.

4. Production process according to claim 1, wherein the insulating polymer is selected from the group consisting of acrylic, styrene, vinyl and cellulose resins, polyolefins, fluoropolymers, polyethers, polyimides, polycarbonates, polyurethanes, silicones, their copolymers and mixtures between homopolymers and copolymers.

5. Production process according to claim 4, wherein the insulating polymer is selected from the group consisting of polyethylene, low density polyethylene, high density polyethylene, linear low density polyethylene, polypropylene, ethylene-propylene diene monomer, polyvinylidine fluoride, ethylene butacrylate and copolymers of ethylene and vinyl acetate, considered singly and in mixture.

6. Production process according to claim 1, wherein the insulating polymer is selected from the group consisting of polyesters, epoxy resins and phenolic resins.

7. Production process according to claim 1, wherein the conductive polymer has a conductivity of at least approximately $10^{-9} S.cm^{-1}$.

8. Production process according to claim 7, wherein the conductive polymer is a single conductive polymer, a conductive polymer grafted onto an insulating polymer or a copolymer containing at least one conjugate system.

9. Production process according to claim 7, wherein the conductive polymer is selected from the group consisting of polythiophene, polyalkyl thiophenes, polyaniline, polypyrrole, polyacetylene, polyparaphenylene, their derivatives and their mixtures.

10. The improved dielectric strength material obtained by the process according to claim 2.

11. The improved dielectric strength material obtained by the process according to claim 4.

12. The improved dielectric strength material obtained by the process according to claim 5.

13. The improved dielectric strength material obtained by the process according to claim 6.

14. The improved dielectric strength material obtained by the process according to claim 9.

15. A power transmission cable or device, comprising the improved dielectric strength material according to claim 10.

16. Production process according to claim 1, wherein the conductive polymer comprises 10 to 500 ppm of the insulating polymer.

17. Production process according to claim 1, wherein the conductive polymer comprises 500 to 1,000 ppm of the insulating polymer.

18. A process for preparing power transmission cables or devices, comprising fabricating a power transmission cable or a device comprising the improved dielectric strength material according to claim 10.

* * * * *